United States Patent [19]

Shinmura

[11] Patent Number: 4,980,818
[45] Date of Patent: Dec. 25, 1990

[54] METHOD AND APPARATUS FOR COMMON RESOURCE STATUS MANAGEMENT IN A COMPUTER SYSTEM INCLUDING A PLURALITY OF COMPUTERS COUPLED TO A COMMON RESOURCE

[75] Inventor: Yoshiaki Shinmura, Yokohama, Japan

[73] Assignee: Hitachi, Ltd., Tokyo, Japan

[21] Appl. No.: 891,884

[22] Filed: Aug. 1, 1986

[30] Foreign Application Priority Data

Aug. 21, 1985 [JP] Japan ................................ 60-183534

[51] Int. Cl.$^5$ .............................................. G06F 13/00
[52] U.S. Cl. .................................. 364/200; 360/98.05; 369/34
[58] Field of Search ............................. 369/30–36; 360/98.04, 98.05, 98.06; 364/200, 900

[56] References Cited

U.S. PATENT DOCUMENTS

| | | | |
|---|---|---|---|
| 4,127,882 | 11/1978 | Kohl et al. | 360/98.05 |
| 4,164,767 | 8/1979 | Gyi et al. | 360/98.03 |
| 4,271,489 | 6/1981 | Siryj et al. | 360/98.05 X |
| 4,314,366 | 2/1982 | Galia | 369/35 |
| 4,348,705 | 9/1982 | Mittal et al. | 360/98.04 |
| 4,402,046 | 8/1983 | Cox et al. | 364/200 |
| 4,480,304 | 10/1984 | Carr et al. | 364/200 |
| 4,527,262 | 7/1985 | Manto | 369/34 X |
| 4,562,306 | 12/1985 | Chow et al. | 380/4 |
| 4,594,657 | 6/1986 | Byrns | 364/200 |
| 4,598,362 | 7/1986 | Rinjo et al. | 364/200 |
| 4,604,690 | 8/1986 | Crabtree et al. | 364/200 |
| 4,604,694 | 8/1986 | Hough | 364/200 |
| 4,610,008 | 9/1986 | Ishibashi et al. | 369/34 |
| 4,670,803 | 6/1987 | De Moss et al. | 360/98.03 X |
| 4,675,755 | 6/1987 | Baumeister et al. | 360/98.01 X |
| 4,675,856 | 6/1987 | Rudy et al. | 369/34 X |
| 4,706,233 | 11/1987 | d'Alayer de Costemore d'Arc | 369/34 X |
| 4,709,326 | 11/1987 | Robinson | 364/200 |
| 4,717,971 | 1/1988 | Sawyer | 369/34 X |
| 4,730,291 | 3/1988 | Ikedo et al. | 369/36 |

Primary Examiner—David L. Clark
Attorney, Agent, or Firm—Antonelli, Terry, Stout & Kraus

[57] ABSTRACT

In a complex computer system in which a resource is shared by several computers, the resource is provided therein with a memory for recording the status of the resource. Each computer writes status information of the resource into the memory and also reads the status information in the memory to know the status of the resource. The memory has a record of the latest status of the resource, allowing each computer to know the latest resource status including status information revised by other computers.

12 Claims, 3 Drawing Sheets

METHOD AND APPARATUS FOR COMMON RESOURCE STATUS MANAGEMENT IN A COMPUTER SYSTEM INCLUDING A PLURALITY OF COMPUTERS COUPLED TO A COMMON RESOURCE

BACKGROUND OF THE INVENTION

1. FIELD OF THE INVENTION

This invention relates to a common resource management method for a complex computer system in which resources are used commonly among a plurality of computers.

2. DESCRIPTION OF THE PRIOR ART

In a complex computer system including a plurality of computers, common resources are used commonly among these computers. The status of a common resource (e.g., setting of recording mediums, occupancy of data sets, etc.) has been managed by each computer individually. Each computer has tables for storing status information of the resources in its main storage or virtual memory so that access control to each resource is implemented using the status information.

This conventional resource management method has the following problems. When, a computer has set the status of a resource, it must indicate that status to other computers which share the resource. However, each computer has independent tables containing resource status information, and therefore the process is required for notifying other computers of the status information set by one computer. This notification is implemented by a unit called a channel-to-channel adapter (CTCA). Information transmitted to other computers indicates whether the resource is being used in the shared mode or exclusive mode, the volume serial number of the recording medium, the attribute of the volume and the like. Because of different means for sending each type of information, there is a need to provide a plurality of control means for respective types of information. A further problem is that frequent communication for the resource status information by the CTCA will adversely affect other data transfers which use the CTCA.

SUMMARY OF THE INVENTION

Accordingly, it is an object of this invention to provide a method of common resource management for a complex computer system, which eliminates the transfer of common resource status information among computers.

Another object of this invention is to unify the management of common resource status information among computers.

According to one aspect of this invention, a common resource has provided therein an individual memory for storing status information, and computers sharing the resource are allowed access to the memory for referencing or revising the status information.

DESCRIPTION OF THE PREFERRED EMBODIMENT

Figure 1:
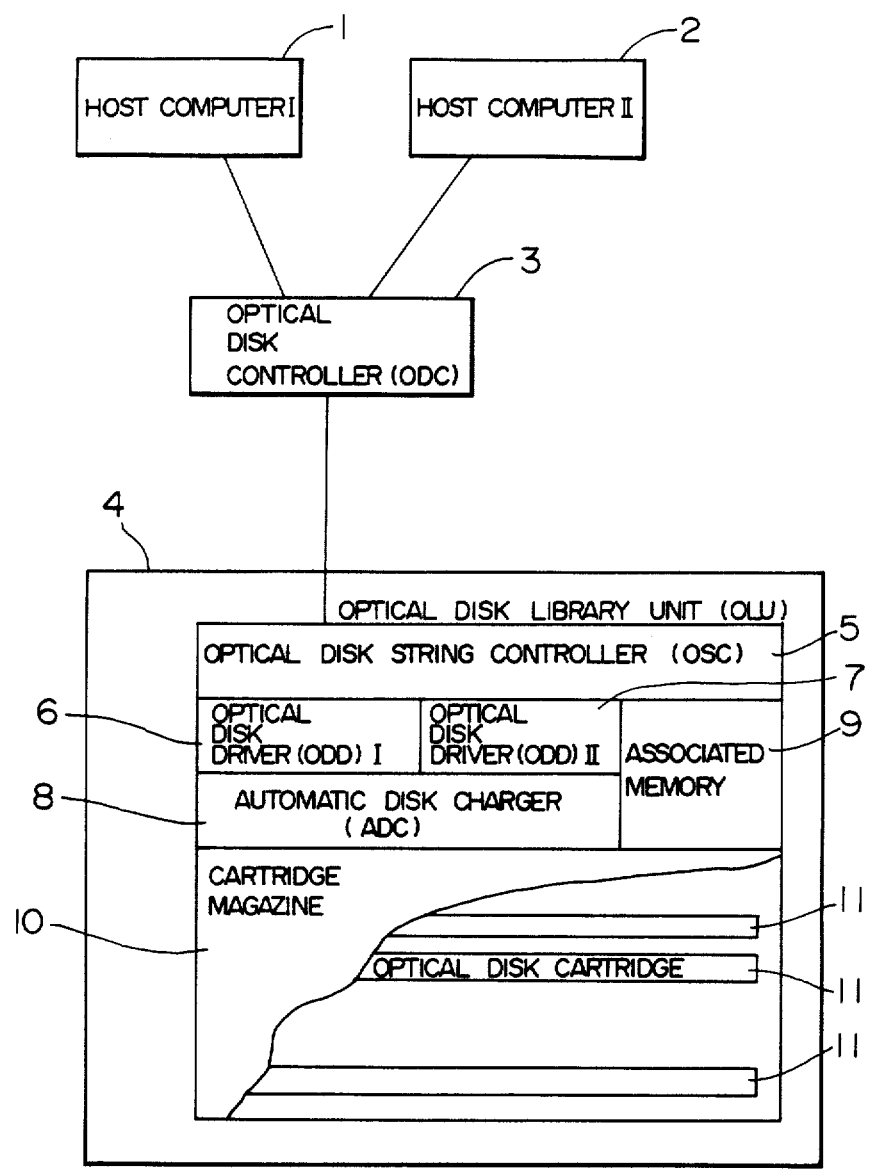
FIG. 1 is a schematic diagram showing a complex computer system of the type to which the present invention is applied.

In FIG. 1 showing the inventive computer system, computers 1 and 2 have individual processing functions. An optical disk library unit (OLU) 4 possesses several optical disk cartridges 11, two of which are mounted on optical disk drivers (ODD) 6 and 7 by means of an automatic disk charger (ADC). The mounted optical disk cartridges 11 operate in reading and writing modes under control of an optical disk string controller (OSC) 5. An optical disk controller (ODC) 3 controls the optical disk library unit 4 in accordance with the instructions issued by the computers 1 and 2. The optical disk library unit 4 differs from conventional ones in the provision of an associated memory 9 and its read/write controller. The conventional optical disk controller and optical disk unit operate as described in U.S. Pat. No. 4,525,839, which is hereby incorporated by reference.

The computers 1 and 2 are arranged to issue novel instructions, including VSN READ command and VSN WRITE command, for making access to the associated memory 9. In addition to the conventional microprogram for interpreting commands issued by the computer to implement specified processings, the optical disk string controller 5 has a microprogram for carrying out the following processings in response to the VSN READ and VSN WRITE commands. Further hardware arrangement is provided in a conventional internal memory for transferring data with computers means for communicating data with the associated memory 9.

In response to receiving the VSN READ command, the microprogram retrieves data from the memory 9 addressed by the command and sends it to the computer. Alternatively, in response to receiving the VSN WRITE command, the microprogram writes data received together with the command into the memory 9 addressed by the command. Namely, the optical disk library unit 4 merely implements reading and writing in the associated memory 9 addressed by the computers and does not further deal with data and address.

Figure 2:
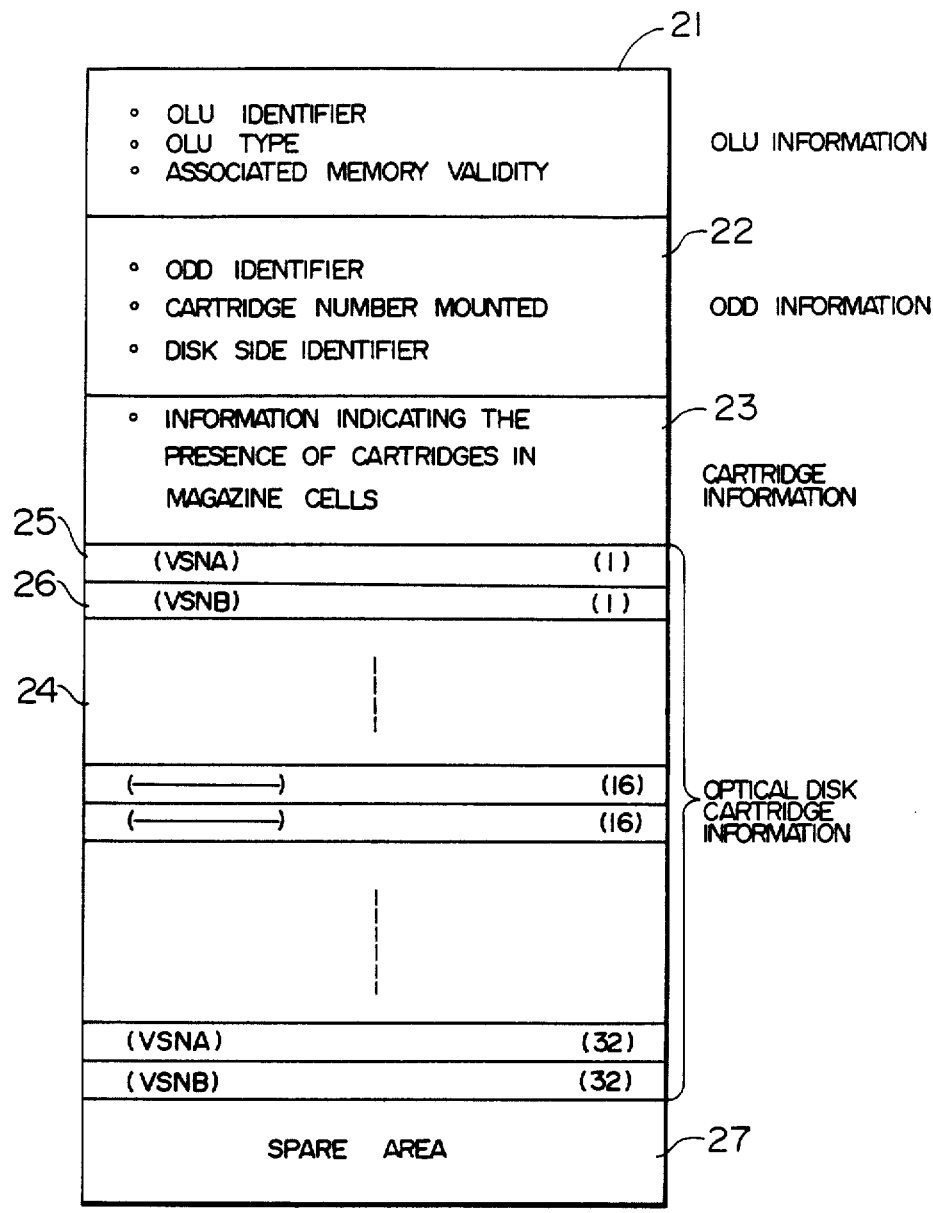
FIG. 2 is a diagram showing the recording format of the associated memory shown in FIG. 1.

FIG. 2 shows the recording format of the associated memory 9, which is established in common for all computers when the system is built. The format consists of OLU information 21 including an identifier of the OLU, information indicating the type of OLU and information indicating the validity of the associated memory 9, ODD information 22 including an ODD identifier, the cartridge number of the disk mounted on that ODD (any of 1-32 in this embodiment) and information indicating the front/rear side of the disk to which read/write access is allowed, cartridge information 23 indicating the presence of a cartridge in each cartridge cell (32 cartridge cells in this embodiment), optical disk cartridge information 24 indicating the volume serial number (VSN) for the front side (VSNA) and the volume serial number for the rear side (VSNB) of the cartridges accommodated in the cartridge cells, and a spare area 27. When there is no cartridge in the cell 16, the optical disk cartridge information 24 has no VSNA and no VSNB for this cell 16. Each cartridge consists of one sheet of optical disk, and each side of an optical disk constitutes a volume.

Figure 3:
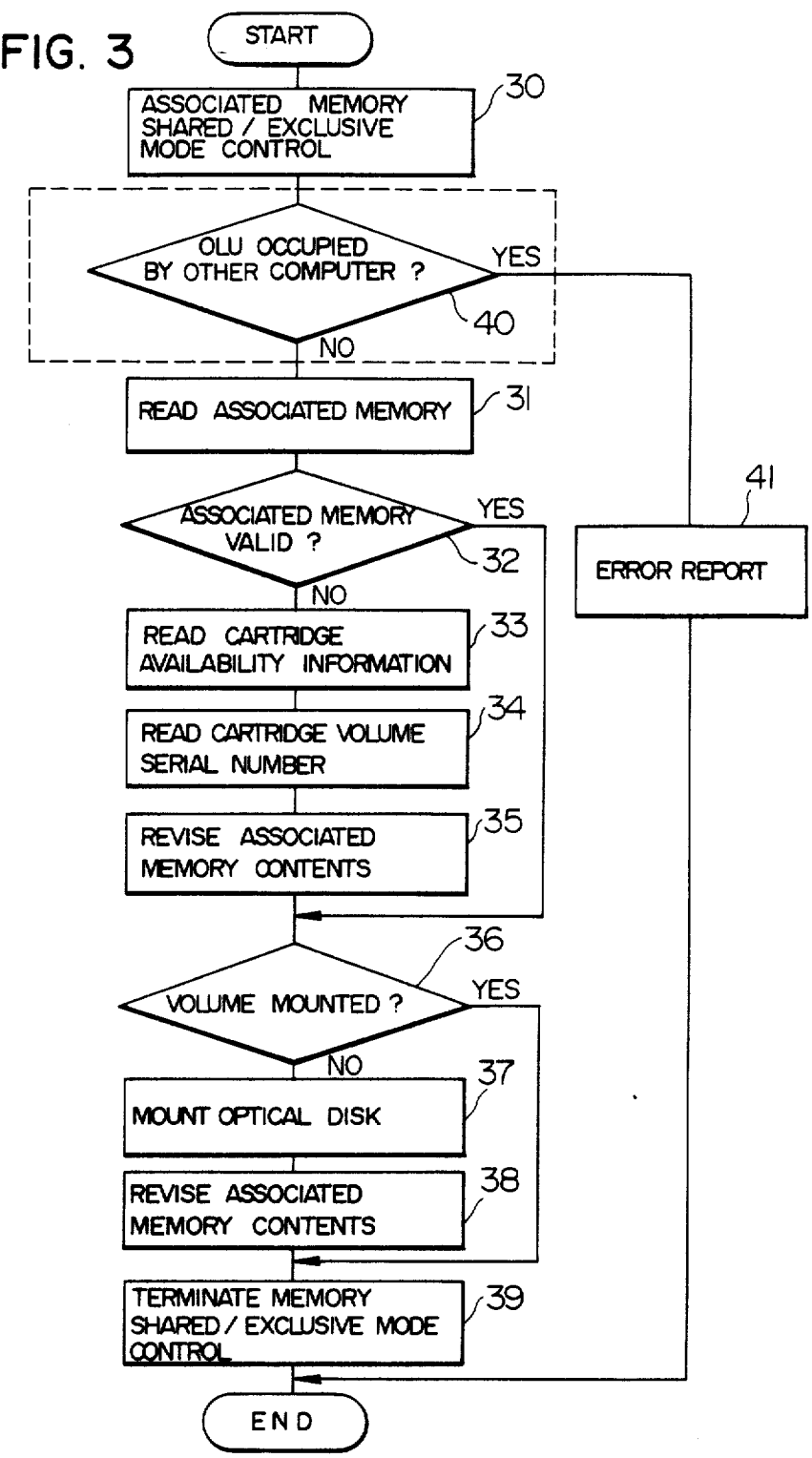
FIG. 3 is a flowchart of the resource status management process according to the present invention.

Next, the inventive optical disk library management process will be described. FIG. 3 shows in flowchart the optical disk library management process carried out by the computers in advance of the conventional read/write access to an optical disk. The conventional read/- write operation which follows the resource status management process will not be explained here.

Initially, a computer issues a device reserve command as in the conventional disk read/write operation. The optical disk controller 3 holds therein flag information indicative of the occupancy of the disk, tests the flag upon receiving the command, and; if the flag is found set (on), imparts the disk occupancy indication to the computer (step 40). Receiving this message of occupancy, the originating computer implements the error report process (step 41) and terminates the resource status management process. When the flag is found reset (off), the optical disk controller 3 sets the flag (on) and imparts the availability indication of the disk to the originating computer (step 40).

The computer next issues the VSN READ command to fetch the contents of the associated memory 9 (step 31). At this time, the operation required for the optical disk library unit 4 is to read out the contents of the associated memory 9 and transfer it to the computer. The management routine analyzes the OLU information 21 in the contents of the associated memory 9 to determine whether it is the intended OLU and whether the associated memory is valid (step 32). If the associated memory 9 is found invalid, the routine initializes the associated memory 9. The routine first reads information to know whether a cartridge is present in each cell (step 33). Subsequently, the routine mounts the cartridge of each cell onto the optical disk driver 6 sequentially to read the volume serial number (step 34). The routine edits write information for the associated memory 9 based on the above information, sets the validity information for the associated memory 9 (on), and subsequently issues the VSN WRITE command to rewrite the contents of the associated memory 9 (step 35). Then the sequence proceeds to step 6. In case the associated memory 9 is found valid in step 32, the sequence immediately proceeds to step 36. The step 36 analyzes the ODD information 22 and optical disk cartridge information 24 to determine whether the intended volume is set on the driver. For a system having more than one optical disk driver, checking is made to identify the driver on which the volume is mounted (step 36). Knowing that the intended volume is mounted on the driver, the computer issues a device release command to reset the occupancy flag in the optical disk controller 3 (step 39) and terminates the resource status management process. If the disk on the driver is found to be other than the intended one, the routine analyzes the optical disk cartridge information 24 to identify the cartridge number of the intended volume, and mounts it on the driver (step 37). Subsequently, the routine revises the ODD information 22 and cartridge availability information 23 in the associated memory 9 (step 38), and then the sequence proceeds to the above-mentioned step 39. Thereafter, the access operation to the mounted optical disk will take place in the same manner as in the conventional system.

When another computer intends to make access to the optical disk library unit 4, exactly the same processing as described above will take place. Namely, the computer reads out the associated memory 9 to check its status. The associated memory 9 has already been initialized, causing the associated memory validity information to be active, and therefore the status of the optical disk library unit is made known immediately by the read-out information.

As described above, the present invention allows the computers in the system to know the latest status of the shared resources without transferring status information among the computers.

I claim:

1. A complex computer system, comprising:
a plurality of computers;
a shared resource for use by said plurality of computers, including memory means for recording characteristics of the shared resource; and
controller means connected between said shared resource and said plurality of computers for controlling said resource and for accessing said memory means to read and update a status of said resource stored therein under control of said computers, wherein said shared resource comprises exchangeable recording mediums for storing data to be processed by said computers, said memory means being provided independently from said recording mediums; and said controller means comprises means for determining whether said shared resource is accessible on the basis of characteristics read from said memory means and means for making said resource accessible by exchanging recording mediums and for revising the recorded characteristics accordingly when the characteristics in said memory means indicate that the shared resource is not accessible at the time a computer requests access thereto.

2. A complex computer system, comprising:
a plurality of computers;
a shared resource for use by said plurality of computers including memory means for recording characteristics of the shared resource; and
controller means connected between said shared resource and said plurality of computers for controlling said resource and for accessing said memory means to read and update characteristics of said resource stored therein under control of said computers, wherein said shared resource comprises a plurality of recording mediums, with identification information appended thereto, for storing data to be processed by said computers, and drive means for mounting and operating at least one of said recording mediums; and said controller means comprises means for comparing recording medium identification information obtained from characteristics read from said memory means with identification information appended to a recording medium mounted on said drive means, means for mounting another recording medium on said drive means and means for storing the identification information appended to said another recording medium in said memory means.

3. A method of common resource status management for a computer system including a plurality of computers coupled to a common resource which is shared among said plurality of computers, said common resource having a memory for recording status information indicating the status of said common resource, said method comprising:
a first step of storing status information indicating the status of said common resource in said memory of said common resource for access of any of said computers;
a second step of reading status information in said memory in advance of access to said common resource by one of said plurality of computers and sending said read status information to said one computer;

a third step of determining in said one computer whether said status information read in said second step is valid;

a fourth step of accessing said common resource by said one computer to determine a current status of said common resource and revising said read status information to indicate said current status if said read status information has been found invalid in said third step; and a fifth step of storing said revised status information in said memory of said common resource.

4. A method according to claim 3, further comprising a step of holding said common resource in a condition of availability to said one computer requesting an access to said common resource for interval of time from said first step to said fifth step.

5. A method according to claim 3, wherein said memory further records validity information indicating validity of status information in said memory, and said third step comprises a step of determining whether said status information read in said second step is valid based on said validity information.

6. A method according to claim 3, wherein said common resource comprises a plurality of recording mediums for storing data and a volume serial number identifying the recording mediums to be accessed by said computers and drive means for mounting and operating at least one of said recording mediums, and said fourth step further comprises a step of mounting said recording mediums on said drive means sequentially and reading out said volume serial numbers from said mounted recording mediums as an indication of said current status and writing said read out volume serial numbers in said memory as part of said revised status information.

7. A method of common resource status management for a computer system including a plurality of computers coupled to a common resource which is shared among said plurality of computers, said common resource having a memory for retaining validity information indicating validity of said memory and status information indicating the status of said resource, said method comprising:

a first step of storing status information indicating the status of said resource in said memory of said common resource for access by any of said computers;

a second step of reading said validity information and said status information from said memory by one of said plurality of computers in advance of access by said one of said plurality of computers to said common resource for use of a function thereof and sending said read status information and validity information to said one computer;

a third step of determining whether said read status information is valid based on said validity information read by said one computer in said second step;

a fourth step of accessing said common resource by said one computer to determine a current status of said common resource and writing current status information in said memory as said status information and valid information as said validity information if said read status information has been found to be invalid in said third step;

a fifth step of commanding said common resource to assume a status requested by said one computer and revising said status information of said memory to indicate said requested status; and a sixth step of accessing said common resource by said one computer for use of a function of said common resource in said requested status.

8. A method according to claim 7, wherein said common resource comprises a plurality of recording mediums for storing data to be processed by said computers and drive means for mounting operating at least one of said recording mediums, said data includes identification information identifying the recording mediums, and wherein said fourth step further comprises a step of mounting said recording mediums on said drive means sequentially and reading out said identification information from said mounted recording mediums as an indication of said current status and writing said read out identification information in said memory as part of said current status information.

9. A method according to claim 7, wherein said common resource comprises at least one means for accessing a recording medium, means storing a plurality of recording mediums for storing data to be processed by said computers and means for exchanging recording mediums between said accessing means and said storing means, said memory being provided independently of said recording mediums, and said fifth step comprises exchanging selected recording mediums between said storing means and said accessing means in response to said status requested by said one computer to said common resource.

10. A method according to claim 7, wherein said common resource comprises a plurality of recording mediums for storing data to be processed by said computers and drive means for mounting and operating at least one of said recording mediums, said data includes identification information for identifying the recording mediums, and said fifth step comprises mounting selected recording mediums requested by said one computer to said drive means.

11. A complex computer system, comprising:

a plurality of computers;

a shared resource for use by said plurality of computers, said shared resource having memory means for recording status information indicating the status of the shared resource;

controller means, connected between said shared resource and said plurality of computers, for controlling access by said computers to said resource;

said shared resource further including means responsive to an instruction from a computer for accessing said memory means to read said status information of said resource stored therein and for sending said status information to said computer; and each computer including means for updating status information received from said shared resource and for sending said updated status information to said shared resource for storage in said memory means, wherein said shared resource comprises exchangeable recording mediums for storing data to be processed by said computers, said memory means being provided independently from said recording mediums, and further comprising means for determining whether said shared resource is accessible on the basis of status information read from said memory means and means for making said resource accessible by exchanging recording mediums and for revising the status information accordingly when the status information in said memory means indicates that the shared resource is not accessible at the time a computer requests access thereto.

12. A complex computer system, comprising:
a plurality of computers;
a shared resource for use by said plurality of computers, said shared resource having memory means for recording status information indicating the status of the shared resource;
controller means, connected between said shared resource and said plurality of computers, for controlling access by said computers to said resource;
said shared resource further including mans responsive to an instruction from a computer for accessing said memory means to read said status information of said resource stored therein and for sending said status information to said computer; and
each computer including means for updating status information received from said shared resource and for sending said updated status information to said shared resource for storage in said memory means, wherein said shared resource comprises a plurality of recording mediums, with identification information appended thereto, for storing data to be processed by said computers, and drive means for mounting and operating at least one of said recording mediums, and further comprising means for comparing recording medium identification information obtained from status information read from said memory means with identification information appended to a recording medium mounted on said drive means, means for mounting another recording medium on said drive means and means for storing the identification information appended to said another recording medium in said memory means.

* * * * *